United States Patent [19]

Askins

[11] Patent Number: 4,479,324
[45] Date of Patent: Oct. 30, 1984

[54] ANIMAL TRAP WITH IMPROVED IMMUNITY TO FALSE ACTUATION

[75] Inventor: William E. Askins, Lititz, Pa.

[73] Assignee: Woodstream Corporation, Lititz, Pa.

[21] Appl. No.: 459,592

[22] Filed: Jan. 20, 1983

[51] Int. Cl.³ .............................................. A01M 23/26
[52] U.S. Cl. ................................................ 43/92; 43/96
[58] Field of Search ............................ 43/81, 88, 92, 96

[56] References Cited

U.S. PATENT DOCUMENTS

| | | | |
|---|---|---|---|
| 1,862,561 | 6/1932 | Adams | 43/92 |
| 2,247,632 | 7/1941 | Graybill | 43/88 |
| 2,489,095 | 11/1949 | Lienhard | 43/92 |
| 2,632,974 | 3/1953 | Cuvillier | 43/92 |
| 4,240,223 | 12/1980 | Medvetz et al. | 43/92 X |
| 4,272,907 | 6/1981 | Skapura | 43/92 |

Primary Examiner—Nicholas P. Godici
Assistant Examiner—M. Jordan
Attorney, Agent, or Firm—Holman & Stern

[57] ABSTRACT

Inadvertent actuation of a rotating jaw trap is eliminated by limiting the rotation of spring-loaded jaw actuators in the trap set position. The position-limited actuators prevent opening of the jaws beyond the set position if one of the jaws is stepped upon by an animal which would otherwise release the trap-setting dog member from the trap trigger pan. With this elimination of slack in the set jaws, the trap is only sprung when the trigger pan is stepped upon. In the preferred embodiment, the limitation of rotation by the actuators is effected by upturned flange members from the trap frame or frame-holding bracket. The flange members may be apertured to receive pivot rods for the actuator members.

18 Claims, 10 Drawing Figures

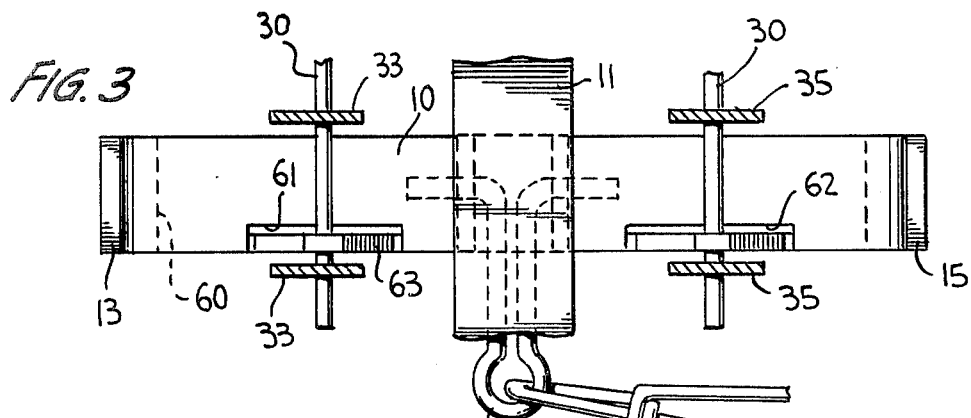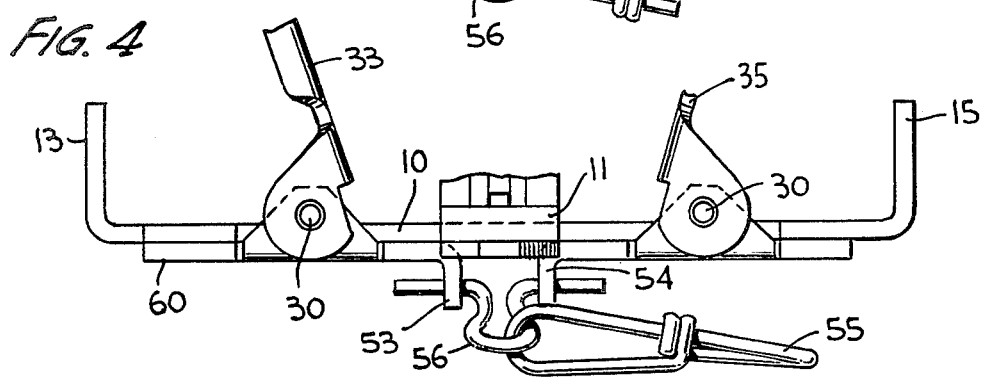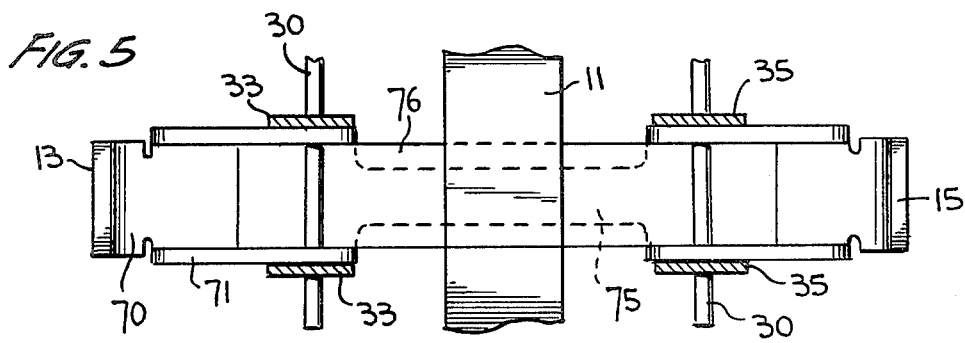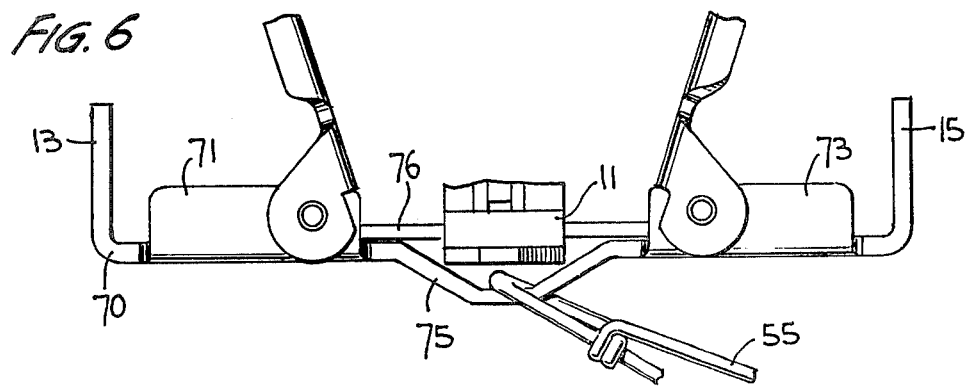

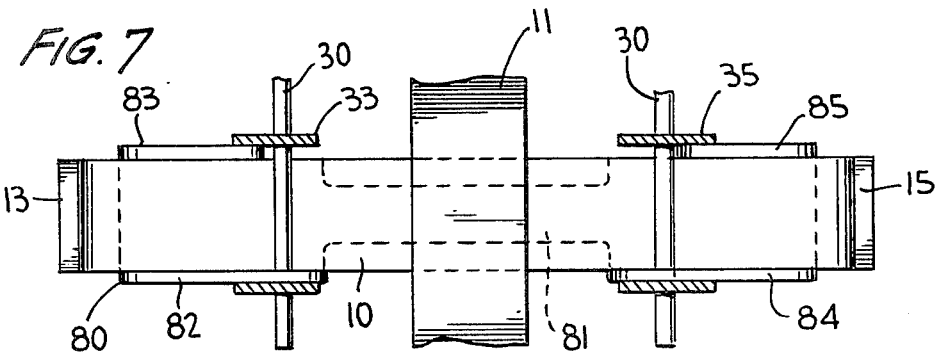
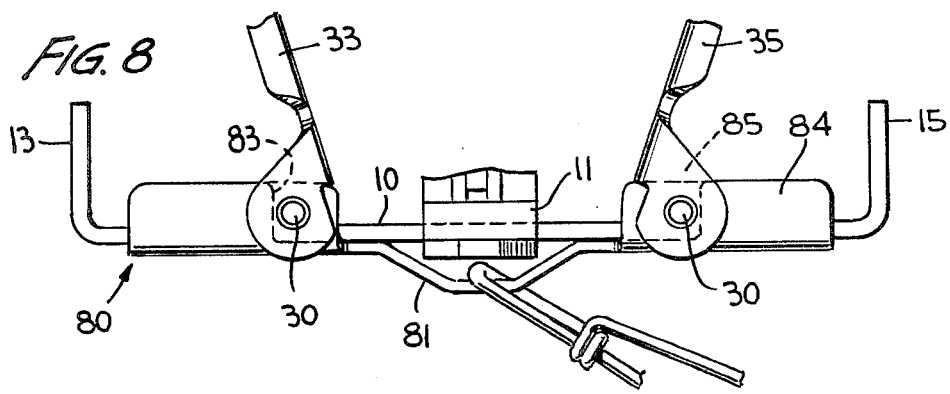
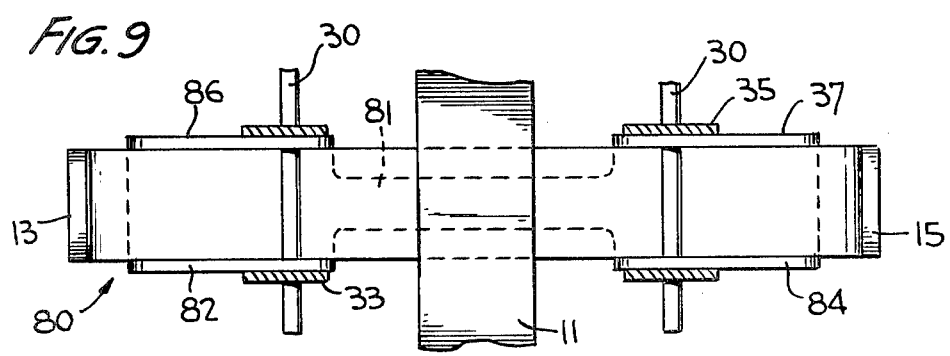
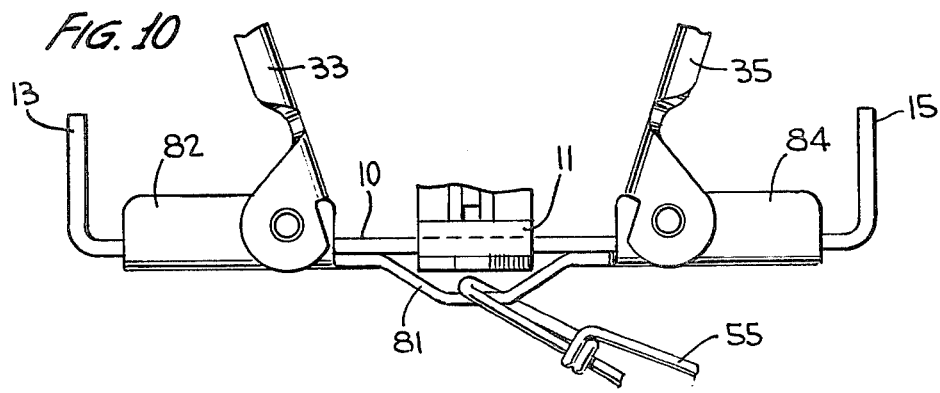

ANIMAL TRAP WITH IMPROVED IMMUNITY TO FALSE ACTUATION

BACKGROUND OF THE INVENTION

1. Technical Field

The present invention relates generally to animal traps and, more specifically, to improvements in pivotable jaw traps of the kind in which a spring-loaded actuator controls the position of the jaws.

2. Prior Art

The trap of the present invention is an improvement of the trap sold for many years by the assignee of the present invention (Victor Animal Trap Company, Division of Woodstream Corporation, Lititz, Pennsylvania) as the "No. 1.75 PROFESSIONAL". Traps of this general nature are illustrated in U.S. Pat. Nos. 2,489,095; 2,632,974; 4,240,223 and 4,272,907. This type of trap is characterized by a pair of pivotable jaws which are biased form a substantially 180° set position to an abutting sprung position by spring-loaded actuator levers. The actuator levers have enclosed apertures through which both jaws extend and are themselves rotatable about axes which are perpendicular to the rotation axes of the jaws. When the levers are separated by a wide angle, the jaws can be moved to the set position wherein a dog member is rotated over one of the jaws to engage a pan-type trigger disposed between the open jaws. The engaged dog member prevents the jaws from closing in response to the urging force of the levers. When the pan is rotated, as by an animal stepping thereon, the dog member is released and leaves the jaws unrestrained. The levers snap the jaws shut and trap the animal's legs therebetween.

This prior art trap is susceptible to being inadvertently sprung when an animal steps on the dog-restrained open jaw rather than on the trigger pan. Specifically, there is some slack beyond the set position of the dog-restrained jaw which permits this jaw to move away from the dog member when this jaw is stepped on. If the restrained jaw so moves, the dog member tends to release from the trigger pan and permits the jaws to be snapped shut by the actuation levers. Since the animal will have stepped only on the restrained jaw and not between the jaws, there is a strong likelihood that the animal will not be trapped between the closed jaws.

OBJECTS AND SUMMARY OF THE INVENTION

It is therefore an object of the present invention to provide an animal trap of the type combined wherein the jaws are prevented from being sprung in response to an animal stepping on the restrained jaw without also stepping on the trigger pan.

It is another object of the present invention to provide an improved animal trap having greater reliability in trapping animals when the trap is actuated.

Still another object of the present invention is to provide improved reliability in an animal trap of the type described by eliminating the aforementioned slack region for the restrained jaw in the set position of the trap.

In accordance with the present invention, a pivotable jaw trap is prevented from being triggered when an animal steps on the restrained trap jaw by limiting the angle separating the actuation levers in the trap set position. Stop members secured to the trap frame define extreme open positions of the levers which in turn restricts further increase in the angular space inbetween the jaws beyond the dog-restrained position. This effectively reduces the slack in the restrained jaw and prevents inadvertent disengagement of the dog member and trigger pan due to jaw movement.

The stop members in the preferred embodiment take the form of flanges extending upwardly from the trap frame of from a bracket which holds the frame. The flanges may be apertured to receive a pivot rod about which the actuation levers pivot.

BRIEF DESCRIPTION OF THE DRAWINGS

The above and still further objects, features and advantages of the present invention will become apparent upon consideration of the following detailed description of specific embodiments thereof, especially when taken into consideration with the accompanying drawings, wherein:

FIG. 3 is a top view in plan of a portion of a modified version of a trap according to FIG. 1;

FIG. 4 is a side elevation view of the portion of the modified trap of FIG. 3;

FIG. 5 is a top view in plan of a portion of a further modified trap according to the present invention;

FIG. 6 is an elevation view of the modified portion of the trap of FIG. 5;

FIG. 7 is a portion of another modified trap according to the present invention;

FIG. 8 is an elevation view of the portion of the modified trap of FIG. 7;

FIG. 9 is a top view in plan of a portion of a still further modified trap according to the present invention; and FIG. 10 is a view in elevation of the portion of the trap of FIG. 9.

DESCRIPTION OF PREFERRED EMBODIMENTS

Figure 1:
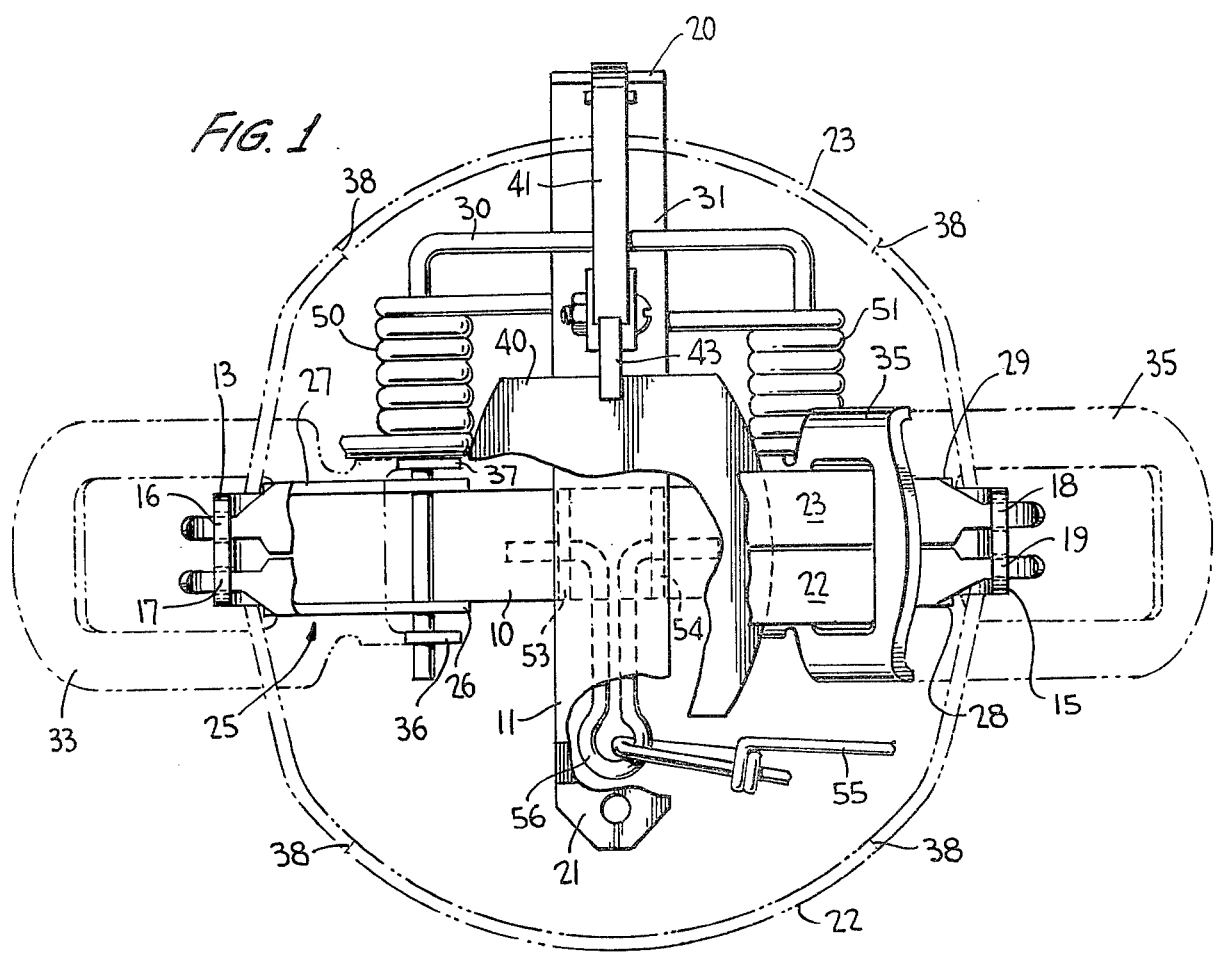
FIG. 1 is a plan view of one embodiment of the trap of the present invention showing the trap in the sprung position in partially broken solid lines and showing the trap in the set position in dashed lines.
Figure 2:
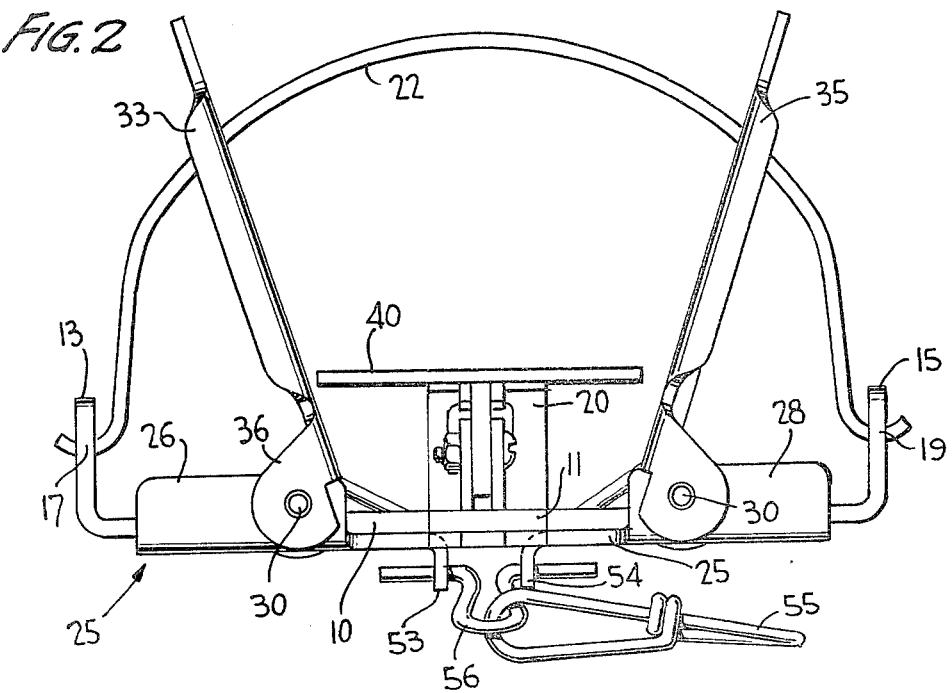
FIG. 2 is a side elevation view of the trap of FIG. 1 shown in the sprung position.

Referring specifically to FIGS. 1 and 2 of the accompanying drawings, a trap according to the present invention includes a frame made up of a first base member 10 and a second base member 11. Members 10 and 11 are preferrably made of steel, as are the other elements of the trap, and are joined by welding or the like intermediate their ends to form a cross-like frame. Opposite ends of base member 10, which is disposed below base member 11, are upwardly bent to define respective flanges 13 and 15. These flanges extend in a vertical plane when the trap is deployed and each is provided with a pair of horizontally-spaced jaw-pivoting apertures designated by the reference numerals 16, 17 for flange 13 and 18, 19 for flange 15. The second base member 11 has a dog-mounting end 20 which is bent generally upward. The opposite or support end 21 of base member 11 is bent downward below the main body of the base member. A pair of generally C-jaws 22, 23 are pivotally secured to flanges 13 and 15. More specifically, opposite end portions of jaw 22 are pivotally received in apertures 17 and 19 of flanges 13 and 15, respectively. Opposite ends of jaw 23 are pivotally received in apertures 16 and 18 of flanges 13 and 15, respectively. Apertures 17 and 19 are aligned to define a horizontal pivot axis for jaw 22, which axis is parallel to a pivot axis for jaw 23 defined by aligned apertures 16 and 18. Jaws 22 and 23 are pivotable between a set position (illustrated in dashed lines in FIG. 1) in which the jaws are spaced approximately 180°, and a sprung position (illustrated in solid lines) in which the angle between the jaws is substantially 0°.

A bracket member 25 is welded, riveted or otherwise secured to the other side of base member 10 and includes an elongated portion extending parallel to base member 10 and having four upturned apertured flanges 26, 27, 28 and 29. Flanges 26 and 27 straddle base member 10 just inboard of jaw-mounting flange 13. The other two apertured flanges 28 and 29 straddle base member 10 just inboard of jaw-mounting flange 15. The apertures in flanges 26 and 27 are aligned to define an actuator lever pivot axis which is horizontal when the trap is in use and perpendicular to the jaw pivot axes defined by apertures 17, 19 and 16, 18. The uppermost edges of flanges 26, 27, 28 and 29 extend a considerable distance above base member 10 to serve a purpose described hereinbelow.

A U-shaped spring retainer pin 30 has two parallel legs which extend along the two actuator pivot axes defined by the apertures in flanges 26, 27 and 28, 29, respectively. Specifically, one leg of retainer pin 30 extends through the apertures in flanges 26 and 27 while the other leg extends through the apertures of flanges 28 and 29. The center portion of U-shaped pin 30 resides in a recess 31 formed across the top surface of base member 11 at a location between dog-mounting end 20 and the intersection with the other base member 10. Recess 31 minimizes movement of pin 30 longitudinally of its legs.

A pair of actuator levers 33 and 35 are pivotally mounted on respective legs of pin 30. Lever 33 is shown only in phantom lines in its open position in FIG. 1 in order that flanges 26 and 27 can be clearly illustrated. The pivotal mounting of lever 33 is achieved with apertures defined in spaced flanges 36, 37 which are disposed in respective vertical planes and receive one leg of pin 30 outboard of respective bracket flanges 26, 27. Similar flanges are provided for actuator lever 35 to engage the other leg of pin 30 outboard of respective bracket flanges 28, 29. The main body of each of levers 33 and 35 is apertured in a plane which contains or is at least parallel with the pivot axis for that lever, which axis is defined by the leg of pin 30 engaged by the apertured flanges of that lever. The aperture in the actuator levers is wide enough to surround respective portions of jaws 22, 23 in their sprung position and in the closed position of actuator levers 33, 35. In this regard it should be noted that when the actuator levers are in their closed position, the lever apertures force the trap jaws closed to the sprung position of the jaws. The outside of each jaw may be provided with a shoulder 38 to abut the actuator lever aperture periphery in the lever closed position and thereby define the closed position by preventing further closure of the mutual angle between the actuator levers. This closed position angle of the levers 33 and 35 is an acute angle which is greater than 0° in the illustrated embodiment. In the open position of the levers, the angle between them is substantially 180° as determined by the bracket flanges 26, 27, 28 and 29 which limit further opening of the actuator levers. Specifically, in the open position of the actuator levers 33 and 35, the underside of lever 33 abuts the uppermost edges of bracket flanges 26 and 27, whereas the underside of lever 35 abuts the uppermost edges of bracket flanges 28 and 29. Contact with the bracket flange upper edges is made by the underside of each lever along opposite sides of the lever aperture.

When the levers 33, 35 are in their open position, the jaws 22, 23 can be pivoted to their set position (i.e. the dashed lines in FIG. 1) wherein they overlie respective sides of each lever in abutting relationship. The set position for the jaws is thus limited by the open position of the levers which, as described above, is defined and limited by bracket flanges 26, 27, 28 and 29.

A trigger pan 40 is pivotally mounted on base member 11 about a horizontal axis which is oriented slightly above and generally perpendicular to the legs of U-shaped retainer pin 30. A dog member 41 is pivotally mounted to the dog-retaining end of base member 11 about a horizontal axis oriented generally parallel to the pan trigger pivot axis. Pan 40 has a neck portion 43 which faces the dog member 41 and which is adapted to receive and hold the distal end of the dog member in the set position of the trap. Jaw 23, in its set position, resides beneath dog member 41 or, more accurately, between the dog member and base member 11. When the distal member of the dog member is retained in a trigger pan slot, jaw 23 is restrained by the dog member from moving from its set position to the sprung position. This, in turn, restrains movement of both actuator levers 33 and 35 from their open position, thereby opposing the bias force of the actuator springs.

The actuator springs 50 and 51 take the form of helical springs surrounding respective legs of retainer pin 30 at a location between the base of the U-shaped pin and base member 10. One end of each spring 50, 51 is disposed beneath base member 11. The other ends are retained along the undersides of respective actuator levers 33, 35 to bias these levers toward their closed position.

The bracket member 25 is provided with a pair of depending eyelets 53, 54 which support a toggle member 56 to which a trap anchor chain 55 is secured beneath the trap. Typically, the distal end of the anchor chain is staked to the ground to prevent a trapped animal from fleeing with the trap clamped to its leg.

In operation, the trap is set by forcing the actuator levers 33 and 35 apart against the bias force of springs 50 and 51, respectively, until the levers abut the bracket flange pairs 26, 27 and 28, 29, respectively. Jaws 22 and 23 are then opened to their set position and the distal end of dog member 41 is inserted into the trigger pan retainer slot. With the trap thusly set, there is no motion slack for the jaws 22 and 23 since they abut the top surfaces of actuator levers 33 and 35. The levers are prevented from movement by the bracket flanges 26, 27, 28 and 29 abutting their undersides and the dog-engaged jaw 23 against their upperside. The dog is thus urged firmly into the trigger pan slot by the force of springs 50, 51 acting through levers 33, 35 and jaw 23. Consequently, an animal which steps on one or the other jaw member, or on one or the other actuator lever, will not trigger the trap since the jaws and actuators are held fast and thereby retain the dog member in the trigger pan slot. It is only when an animal steps on and rotates the trigger pan that the trigger pan slot is rotated upward and releases the dog member 41. The dog member then no longer restrains jaw 23 which, in turn, no longer restrains the actuator levers 33, 35. The levers 33, 35 are thus rapidly pivoted closed by spring 50, 51 and force the jaws 22, 23 to spring shut.

The stop mechanism associated with bracket 25 can take a variety of other forms, such as illustrated in FIGS. 3–10 wherein elements similar to those illustrated in FIGS. 1 and 2 bear the same reference numerals. Referring specifically to FIGS. 3 and 4, bracket member 25 of FIGS. 1 and 2 is replaced by bracket member 60. Instead of flanges which straddle the transverse sides of base member 10, the base member 10 has longitudinally-aligned slots 61, 62 defined in one of its sides and through which upturned longitudinally-aligned bracket flanges 63 and 64 project. The uppermost sides of flanges 63 and 64 serve as stops for actuator levers 33 and 35 in the open position of the levers. Flanges 63 and 64 are also apertured to receive the legs of pivot pin 30. It is noted that the bracket flanges are provided on only one side of the base member 10 in this embodiment; however, it should be further noted that slots may be provided on the opposite side of base member 10 to provide space for two additional bracket flanges to serve as stop members for the actuator levers and as pivot retainers for the pivot pin 30. In addition to functioning as a stop means for the levers, the flanges also serve to support the pivot pin 30 and to define the pivot axes for the levers 33, 35.

In the embodiment of FIGS. 5 and 6, the bracket and base member are formed as one integral member 70 which is provided with four upturned apertured flanges 71, 72, 73 and 74. This integral member 70 has a recessed intermediate portion 75. A strengthening plate 76 is secured along the top surface of member 70 to prevent the latter from buckling at recess 75. The space between recess 75 and plate 76 serves as a loop for engaging the proximal end of anchor chain 55. The four flange brackets are apertured to receive pin 30 and also to serve as open position stops for actuator levers 33, 35. The embodiment of FIGS. 7 and 8 shows a bracket member 80 secured beneath the base member 10. The intermediate portion of the bracket is recessed at 81 to form a loop for engaging anchor chain 55. Bracket flanges 82 and 84 are identical to bracket flanges 26 and 28 of FIGS. 1 and 2. Bracket flanges 85 and 86 are shorter in horizontal length than the brackets 81 and 82 and are not apertured to receive pin 30. Thus, all four brackets serve the stop function for actuator levers 33 and 35 but only brackets 82 and 84 receive the spring retainer pins 30. The embodiment of FIGS. 9 and 10 is identical to that of FIGS. 7 and 8 except that bracket flanges 83 and 85 are replaced with flanges 86 and 87, respectively. The latter are co-extensive with flanges 82 and 84 and are apertured to receive the retainer pin 30.

Each of the embodiments of the trap described herein serve to limit the angle of the actuator levers in their open position, thereby preventing slack when the actuator levers are secured in place by the set trap jaw 23 and the overlying dog member 41. The elimination of the actuator lever slack eliminates slack in the open jaw 23 and thereby prevents disengagement of dog member 41 should the open jaws or actuator levers be stepped on by the animal without rotation of the pan trigger. False trap actuation is thereby substantially eliminated so that the trap is sprung only in response to an animal stepping on the trigger pan.

While I have describe and illustrated various specific embodiments of my invention, it will be clear that variations from the details of construction which are specifically illustrated and described may be resorted to without departing from the true spirit and scope of the invention as defined in the appended claims.

I claim:

1. A trap comprising:
    a frame;
    first and second jaws pivotally mounted on said frame for movement between set and sprung positions, said set position being characterized by a relatively large angular spacing between said jaws, said sprung position being characterized by a substantially zero angle between said jaws;
    spring loaded actuator means being outwardly pivoted movable between open and closed positions, for continually biasing said jaws toward said sprung position;
    setting means for defining said relatively large angular spacing by holding said jaws in said set position against the urging of said actuator means;
    trigger means for selectively releasing said setting means to permit the jaws to be snapped to said sprung position by said actuator means; and
    stop means secure to the said frame for preventing the angular spacing between said jaws from exceeding the spacing defined by said setting means.

2. The trap according to claim 1 wherein said stop means comprises a means for engaging said actuator means in said open position to prevent movement of said actuator means beyond said open position.

3. The trap according to claim 2 wherein said actuator means comprises a pair of levers which are pivotally mounted relative to said frame, wherein said levers form a wide angle in said open position and a narrow angle in said closed position, and wherein said stop means comprises members extending from said frame into contact with said levers in said open position to prevent the angular spacing between said levers from increasing beyond said wide angle.

4. The trap according to claim 3 wherein said stop means further comprises means for pivotally mounting said levers relative to said frame.

5. In an animal trap of the type comprising a frame, a pair of jaws mounted adjacent one another on said frame for pivotable movement about first and second parallel axes, respectively, and between set and sprung positions, said jaws in said set position defining a relatively large angle therebetween and in said sprung position defining an angle of substantially zero degrees therebetween, a pair actuator levers each having a pivot engagement portion and a jaw-enclosing portion, pivot means for engaging said pivot engagement portions of said actuator levers relative to said frame to permit outwardly pivotable movement of said pair of levers about third and fourth parallel axes oriented perpendicular to said first and second axes and between open and closed positions, said levers in said open position defining a relatively wide angle therebetween and in said closed position defining a relatively narrow angle therebetween, said jaw-enclosing portion of each lever being in the form of an aperture which totally surrounds both of said jaws to force the jaws to said sprung position when the levers are in their closed position and to permit the jaws to be moved to their set position when the levers are in their open position spring means for forcefully urging said levers toward said closed position, setting means for defining said set position by holding said jaws in said set position against the urging of said levers and said spring means, and actuable trigger means for releasing said setting means to permit said jaws to be snapped by said levers to said sprung position under the urging of said spring means, an improvement comprising: at least first and second stop means secured to said frame for limiting pivotable movement of said levers in said open position to thereby limit the size of said relatively wide angle, said stop means including means for preventing said jaws from pivoting beyond said set position as defined by said setting means.

6. The trap according to claim 5 wherein said pivot engagement portions of each lever includes a pair of aligned apertures disposed concentrically about one of said third and fourth axes, wherein said pivot means includes respective pivot bars extending along said third and fourth axes through corresponding pairs of said aligned apertures to permit pivotable movement of said levers about respective pivot bars, and wherein said first and second stop means each include a further aperture disposed concentrically about said third and fourth axes, respectively and through which a respective pivot rod extends to thereby secure said pivot rods and levers to said bracket and frame.

7. The trap according to claim 6 wherein said first and second stop means comprise part of a bracket member secured to said frame.

8. The trap according to claim 7 wherein said frame includes a first elongated base member having upturned opposite ends for pivotally engaging opposite ends of said jaws, wherein said bracket member includes a flat portion secured beneath said frame and a pair of longitudinally-spaced upturned flanges, which correspond to said first and second stop means, extending upwardly beyond said first base member, said flanges having uppermost edges which contact and motion-limit said levers in said open position.

9. The trap according to claim 8 further comprising third and fourth stop means, said third stop means comprising:
   a first further upturned flange of said frame member which is transversely spaced from one of said pair of longitudinally spaced flanges;
   and a second further upturned flange of said frame member which is transversely spaced from the other of said pair of longitudinally spaced flanges;
   wherein all four flanges have substantially co-planar uppermost edges which contact and motion-limit said levers in said open position.

10. The trap according to claim 9 wherein said first and second further flanges each have apertures defined therein, the aperture in said first further flange being axially aligned with the aperture in said one of said pair of flanges to receive the pivot rod which extends through said one of said pair of flanges, the aperture in said second further flange being axially aligned with the aperture in the other of said pair of flanges to retain the pivot rod which extends through said other of said pair of flanges.

11. The trap according to claim 8 wherein said first base member includes respective cut out portions through which said pair of flanges upwardly extend.

12. The trap according to claim 7 further comprising a chain having a first and a second end, said second end having a staking member secured thereto and adapted to be staked to the ground, said second end being secured to said trap.

13. The trap according to claim 12 wherein said bracket further comprises further means for securing said second end of said chain to said trap.

14. The trap according to claim 13 wherein said further means comprises a downwardly-recessed part of said flat portion of said bracket member at a location between said pair of longitudinally spaced flanges.

15. The trap according to claim 6 wherein said frame includes a bracket member having upturned opposite ends for pivotally engaging opposite ends of said jaws, an intermediate portion extending between said upturned opposite ends, and at least two upturned longitudinally-aligned flanges, said two flanges having respective apertures defined therethrough and disposed concentrically about said third and fourth axes, respectively, wherein each pivot rod extends through a respective flange aperture to secure the pivot rods and levers to said bracket member.

16. The trap according to claim 15 wherein said intermediate portion of said bracket is recessed downwardly along a portion of its length and is adapted to engage an anchor chain, said trap further comprising a strengthening plate disposed above the recess in said bracket member to provide structural strength for the bracket member.

17. The trap according to claim 6 wherein said spring means comprises a pair of helical springs disposed about said pair of pivot bars, respectively, each having one end disposed beneath said frame and in other end engaging a respective lever to urge that lever towards said closed position.

18. The trap according to claim 5 wherein said relatively large angle between said jaws and said set position is approximately 180°.

* * * * *